(12) United States Patent
Lehmann et al.

(10) Patent No.: US 10,014,635 B2
(45) Date of Patent: Jul. 3, 2018

(54) GROUNDING CLIP FOR AN AIRBAG IGNITION SYSTEM

(71) Applicant: DELPHI INTERNATIONAL OPERATIONS LUXEMBOURG S.A.R.L., Bascharage (LU)

(72) Inventors: Rene Lehmann, Fuerth (DE); Vincent Regnier, Spardorf (DE); Frank Odorfer, Rothenbach an der Pegnitz (DE); Bartlomiej Siwek, Krakow (PL)

(73) Assignee: DELPHI INTERNATIONAL OPERATIONS LUXEMBOURG S.A.R.L., Luxembourg (LU)

( * ) Notice: Subject to any disclaimer, the term of this patent is extended or adjusted under 35 U.S.C. 154(b) by 76 days.

(21) Appl. No.: 14/955,162

(22) Filed: Dec. 1, 2015

(65) Prior Publication Data
US 2016/0181731 A1 Jun. 23, 2016

(30) Foreign Application Priority Data
Dec. 18, 2014 (EP) .................................. 14199003

(51) Int. Cl.
*H01R 13/6582* (2011.01)
*H01R 13/648* (2006.01)
(Continued)

(52) U.S. Cl.
CPC ......... *H01R 13/648* (2013.01); *B60R 21/017* (2013.01); *H01R 13/655* (2013.01); *H01R 13/6485* (2013.01)

(58) Field of Classification Search
CPC ............ H01R 13/6582; H01R 13/7032; H01R 13/658; H01R 13/648; H01R 23/688; H01R 23/6873; H01R 23/7073
(Continued)

(56) References Cited

U.S. PATENT DOCUMENTS 6,663,411 B2 * 12/2003 Little .................. H01R 13/501
439/188
7,833,044 B2 * 11/2010 Bouchan ............ H01R 13/6273
439/352
(Continued)

FOREIGN PATENT DOCUMENTS

EP 1073160 A1 1/2001
EP 1401063 A1 3/2004
(Continued)

OTHER PUBLICATIONS

European Search Report dated May 21, 2015.

*Primary Examiner* — Gary Paumen
(74) *Attorney, Agent, or Firm* — Robert J. Myers

(57) ABSTRACT

The invention relates to a grounding clip for an airbag ignition system adapted to be mounted to an airbag retainer insert. The clip comprises a first grounding contact in form of a spring tongue adapted to contact a grounding contact of a squib connector and a second grounding contact adapted to contact an electroconductive part of an airbag squib. The clip comprises a flat base connecting the first and second grounding contacts with each other, wherein the spring tongue has a straight portion that extends perpendicular from the flat base and wherein the free end of the spring tongue comprises a bent portion that is not perpendicular to the base.

25 Claims, 4 Drawing Sheets

(51) Int. Cl.
*B60R 21/017* (2006.01)
*H01R 13/655* (2006.01)

(58) Field of Classification Search
USPC .......................................... 439/108, 188, 95
See application file for complete search history.

(56) References Cited

U.S. PATENT DOCUMENTS

2002/0137397 A1  9/2002 Little
2009/0098758 A1  4/2009 Bouchan et al.

FOREIGN PATENT DOCUMENTS

| EP | 1684383 A1 | 7/2006 |
|---|---|---|
| WO | 9720368 A1 | 6/1997 |
| WO | 2004020933 A1 | 3/2004 |
| WO | 2010070391 A1 | 6/2010 |

* cited by examiner

GROUNDING CLIP FOR AN AIRBAG IGNITION SYSTEM

CROSS-REFERENCE TO RELATED APPLICATION

This application claims the benefit under 35 U.S.C. § 119(a) of Patent Application No. 14199003.6 filed in the European Patent Office (EPO) on Dec. 18, 2014, the entire disclosure of which is hereby incorporated by reference.

TECHNICAL FIELD OF THE INVENTION

The invention relates to grounding clips for airbag ignition systems adapted to be mounted to an airbag retainer insert, an airbag retainer insert comprising such a grounding clip and an airbag squib connector adapted to cooperate with such a retainer.

BACKGROUND OF THE INVENTION

Modern passenger cars have a number of airbags, such as front and side airbags, which serve to cushion the impact of the passenger with for example interior parts of a passenger car in case of an accident. The airbag assembly is usually located on the steering wheel or column, the dash board or the side of the door panels etc. The airbag surface is inflated by means of an explosive device known as a squib. The wires or cables from the crash sensors of the car are connected to the squib by means of a so called squib connector. To this aim, the squib is provided with a socket which contains two contact pins. The squib connector comprises a plug part corresponding to the socket. To improve the connection between the squib and squib connector airbag retainer inserts are used, which are adapted to fit into the receptacle of the airbag squibs and which facilitate and secure the connection between squib and squib connectors. These retainer inserts (also abbreviated as "retainer" or "insert") are commonly provided with some kind of electroconductive clip, that short circuits the contact pins of the airbag squib before a squib connector is connected to the squib. Further, it is required that the squib connector is grounded before the terminals of the squib connector come into contact with the pins of the airbag squib. To this end, the electroconductive clips used in the past were often provided with some kind of grounding contact (sometimes also denoted as grounding contact), which establish electrical continuity between e.g. the body of the vehicle and the squib connector upon mating of the squib connector with the airbag squib.

The principle structure of an airbag squib is for example described in WO 2004/020933. The airbag squib disclosed in this document comprises an outer casing enclosing an igniter including a suitable pyro-technique charge. The squib is provided with two contact pins that are electrically connected to an igniter wire, which can activate the charge of the squib.

In document EP 1 073 160 a further development of an airbag retainer insert is disclosed. The insert is a piece of injection molded plastic, which is adapted to be inserted in the receptacle of an airbag squib. The insert is provided with a shorting clip, having two shorting tongues adapted to short circuit the pins of the squib. The clip additionally comprises a contact tongue that is adapted such that it is electrically connected to an earth connection situated on the plug of a squib connector, when the plug connector is inserted into the squib receptacle. However, the construction requires relatively large plate like structural members and the grounding contact is bent upwards from the base of the clip and runs for the most part parallel to the plate like structural members. Therefore, the clip requires a lot of space for installation in or onto the retainer. This in turn constricts the design freedom for the retainer, which is often undesirable.

The EP 1 401 063 A1 describes a similar construction comprising a retainer insert having a shorting clip mounted thereto. The shorting clip is provided with two contact tongues to short circuit the contact pins of an airbag squib. In the embodiments shown in this document, also grounding contacts are provided. However, the grounding contact of the FIG. 1 embodiment consists essentially of a flat plate member that extends perpendicularly from the base of the clip. The grounding contact of this embodiment does further not have any spring feature to enhance or improve the contacting with the corresponding counter contact of the squib connector. In the embodiment of FIG. 2 of this document, two grounding contacts are shown, that have an s-shape configuration protruding upwards from the flat base of the clip. The s-shape configuration provides a spring function to the contacts that improves the contacting with the corresponding counter contact of the squib connector. However, due to the s-shape of the grounding contacts, this type of clip connector is difficult to mount onto a retainer insert and the s-shape configuration of the two grounding contacts requires a lot of space, which is disadvantageous.

In the WO 2010/070391 A1 another embodiment of a shorting clip for an airbag ignition system is shown, which is provided with two contact members to short circuit the pins of an airbag squib and with first and second grounding contacts adapted to establish earth continuity between a ground contact of a squib connector and an electro-conductive part of the squib. However, this construction does not have a base but rather a support structure that is essentially parallel to the plug-in direction of the retainer insert. While this offers some advantages with regard to the installation height of the clip, it does not provide the same structural integrity as a solution that is based on a flat base, as in the other discussed prior art documents above.

BRIEF SUMMARY OF THE INVENTION

According to the invention, a grounding clip for an airbag ignition system is provided, that is adapted to be mounted to an airbag retainer insert and comprises at least one first grounding contact in form of a spring tongue, adapted to contact a grounding (earth) contact of a squib connector, at least one second grounding contact adapted to contact an electroconductive part of an airbag squib; and a flat base, that connects the first and second grounding contacts with each other. The spring tongue has a straight portion that extends perpendicular from the flat base and the free end of the spring tongue comprises a bent portion that is not perpendicular to the base. This construction allows a very space saving configuration, since the spring tongue is for the most part perpendicular to the flat base and only the tip of the tongue may comprise a bent portion that provides the spring effect of the spring tongue and thus enhances the contacting with a corresponding counter grounding contact. The flat base connecting all the parts together provides a very robust design of the grounding clip. Since the bent portion of the spring tongue is designed to be in contact with the corresponding counter grounding contact, it is advantageous that it is provided at the tip of the tongue, since the grounding contact should be furthest away from the flat base of the grounding clip. The reason for that being, that the grounding contact upon mating of the squib connector with the squib has to be established, before the contact pins of the squib come into contact with the corresponding terminals of the squib connector. The second grounding contact provides earth continuity by contacting an electroconductive part of the airbag squib, whereby any electrostatic discharge (ESD) problems upon mating can be avoided. The grounding clip therefore safeguards that upon mating, first earth continuity is established between the squib connector and the parts of the airbag squib, before any electroconductive part of the squib connector comes into contact with the pins. Any undesired electrostatic charge of the squib connector is thus discharged before it can accidentally trigger an ignition of the airbag squib.

The spring tongue may be arranged at an edge of the flat base and the bent portion protrudes outwards, away from the flat base. With the prior art designs, any bending of the grounding contact was directed towards the center of the base. This required large cavities or clearances in the airbag retainer, onto which the clip is to be mounted.

The grounding clip does not have any means to short circuit the pins of the airbag squib. Therefore, the grounding clip is free from means to short circuit the pins of the airbag squib. By eliminating any contact surfaces to short circuit the pins, the design of the grounding clip is less complex and thus less costly. The grounding clip may be designed such that no part of the clip comes into contact with any of the two contact pins of the airbag squib.

The straight portion of the spring tongue may extend for at least 30% to 50% or more of the length of the spring tongue. In other words, the straight portion of the spring tongue makes up a substantial portion of the whole length of the spring tongue and advantageously, the bent portion of the spring tongue makes up only a small part of the whole length of the spring tongue. This allows a compact design of the grounding clip and facilitates the mounting of the grounding clip to an airbag retainer.

The flat base may comprise at least one cut out adapted to receive the contact pins of an airbag squib there through. To allow for a particular robust design of the clip, the base is a relatively solid sheet of metal and has only the necessary cutouts for the contact pins.

The spring tongue may comprise a latching hook adapted to latch the grounding clip onto an airbag retainer insert, and the latching hook may be arranged at the straight portion of the spring tongue. In the art, the clips were either not fixed at all to the retainers and were only held in position by the connection between the retainer and the housing of the airbag squib, or they were fixed onto the retainer by means of a spring action. The latching hook offers an improved fixation of the clip onto the retainer, by providing a form locking connection between clip and retainer. This facilitates the mounting procedure, since an operator can first assemble the clip to the retainer and then the retainer to the airbag squib, without the clip becoming unintentionally loose from the retainer. The latching hook may protrude inwards, towards a center of the flat base.

The grounding clip may comprise two pairs of grounding contacts adapted to contact electric conductive parts of an airbag squib, wherein each pair is arranged on respective opposite ends of the flat base. Such a symmetric arrangement provides for a particularly secure electrical contacting of the grounding contacts with the other parts of the airbag squib. The flat base may be essentially rectangular and comprise a grounding contact at each corner of the flat base.

The clip may comprise an additional fixing leg that protrudes perpendicular from the flat base. The fixing leg can be provided in addition or as an alternative to the latching hook provided on the spring tongue. This fixing leg may have essentially a T-shape and extend in the plane that is perpendicular to the plane defined by the flat base. This arrangement allows for a relatively compact design and the T-shape provides a large number of edges that allows for a form locking interaction with the airbag retainer insert.

The clip may be shaped such that when assembled to an airbag retainer insert the flat base is flush with the bottom of the retainer insert and the spring tongue extends through the inside of the retainer insert. When the clip is flush with the bottom of the retainer insert, the overall installation height can advantageously be reduced. By arranging the spring tongue inside of the retainer insert, it can advantageously be avoided that the spring tongue is damaged or accidentally bent in an inappropriate way during handling of the airbag retainer.

The present invention also relates to an airbag retainer insert for an airbag ignition system comprising a grounding clip as described herein. The grounding clip may be mounted to the retainer insert, such that the free end of the spring tongue is arranged in an undercut of the retainer such that the spring tongue is pre-tensioned. In other words, the free end of the spring tongue is engaged by a part of the retainer, such that e.g. a force is applied onto the tip of the spring tongue. This pre-tensioning can improve the contact quality of the spring tongue with a corresponding counter grounding contact. The pre-tensioning is particularly simple to achieve, when the grounding clip is provided with the latching hook as described above and/or with an additional fixing leg.

The present invention also relates to an airbag squib connector that is in particular suited to co-operate with an airbag retainer as described, wherein the connector comprises a connector housing having a plug-in portion, two female contact terminals at least partially in the plug-in portion, where each terminal is provided with an electrical signal line that extends through the connector housing. Further, a grounding contact extends through the connector housing essentially parallel to the electrical signal lines, whereby the grounding contact has a first portion that extends in the plane perpendicular to the mating direction and a second portion that branches off perpendicular from the first portion in essentially the same plane as the first portion, and whereby the second portion comprises a contact portion that extends in the mating direction. The particular shape of the grounding contact takes up only a minimum of space in the connector housing yet it offers the advantage, that the actual contact portion of the grounding contact can be freely chosen, i.e. it offers a larger range of possible positions for the grounding contact. The first, second and the contact portion may be made from a single piece of sheet metal that is cut and bent as needed.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

It is therefore an object of the present invention to provide a grounding clip for an airbag ignition system as well as a retainer insert comprising such a clip and an airbag squib connector to cooperate with these parts, that reduces or minimizes the above described problems and disadvantages. It is in particular an object of the present invention to provide a grounding clip, that is easy to mount to an airbag retainer insert and that provides a secure and improved contacting with the corresponding grounding contact of an airbag squib connector. It is a further object of the invention to achieve all of the above with a grounding clip, which does not provide any shorting function for the pins of an airbag squib and which is in contrast designed to securely avoid any electrical contact with the contact pins of the airbag squib.

These and further objects which become apparent upon reading the following description, are solved by a grounding clip according to claim 1, an airbag retainer insert according to claim 12 and an airbag squib connector in accordance with claim 14.

Figure 1:
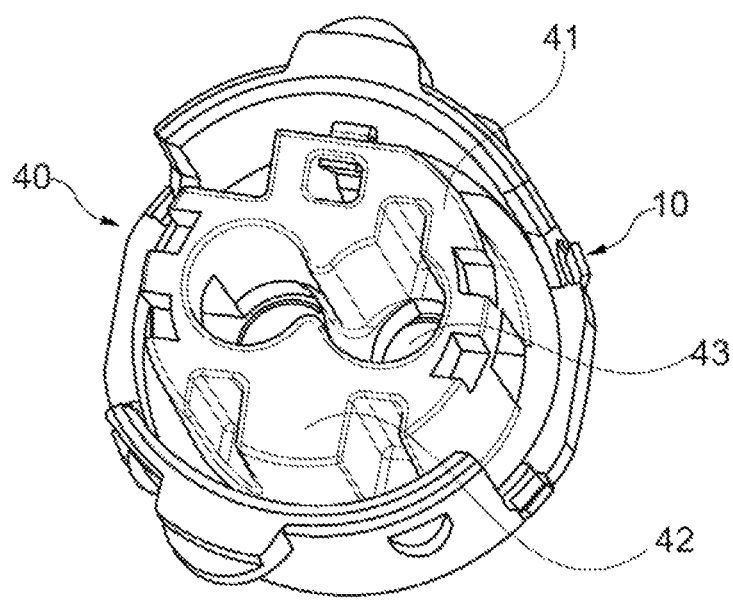
FIG. 1 shows a 3-dimensional schematic view of an airbag retainer insert provided with a grounding clip.

FIG. 1 shows an airbag retainer insert 40, hereinafter referred to as a retainer 40, in a 3-dimensional view, as seen in mating direction. The retainer 40 has a mating face 41 comprising coding elements 42 and an aperture 43 in the shape of an hour glass. In assembled condition, the retainer 40 will be mounted in a receptacle of an airbag squib and the contact pins of the squib will extend into this aperture 43. A grounding clip 10 is mounted to the retainer 40 from the bottom thereof. The grounding clip 10 is shown in more detail in FIG. 4. One can see from the illustration in FIG. 1 that the grounding clip 10 does not have any means to short circuit the pins of the airbag squib, such as for example corresponding contact tongues, which in the art would protrude into the aperture 43. In other words, the grounding clip 10 is free from means to short circuit the pins of the airbag squib.

Figure 2:
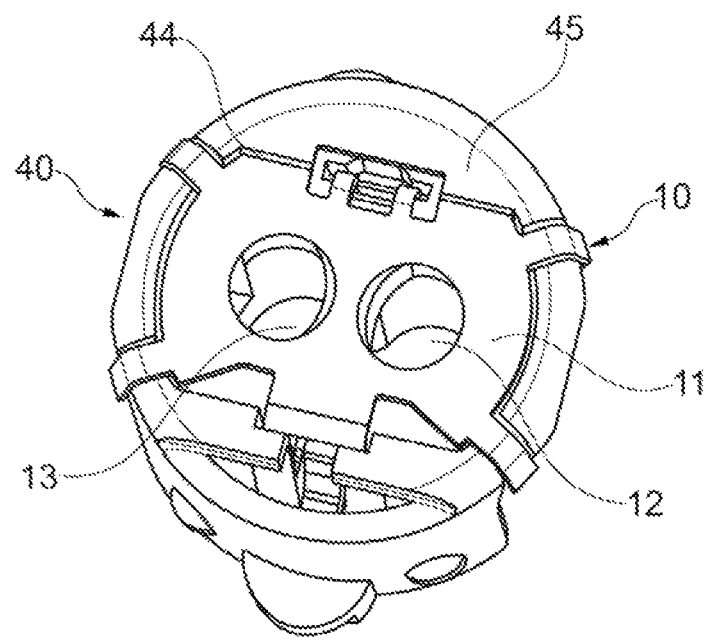
FIG. 2 shows the retainer of FIG. 1 from the bottom.

FIG. 2 shows the retainer 40 from FIG. 1 from the bottom, i.e. rotated by 180°. The bottom 45 of retainer 40 comprises a recess 44, which is just deep enough to accommodate the flat base 11 of the grounding clip 10, such that the grounding clip 10 is flush with the bottom 45 of retainer 40. The flat base 11 has two cutouts 12, 13, that are adapted to receive the contact pins of an airbag squib there through. Further, one can see from FIG. 2, that the flat base 11 is essentially rectangular.

Figure 3:
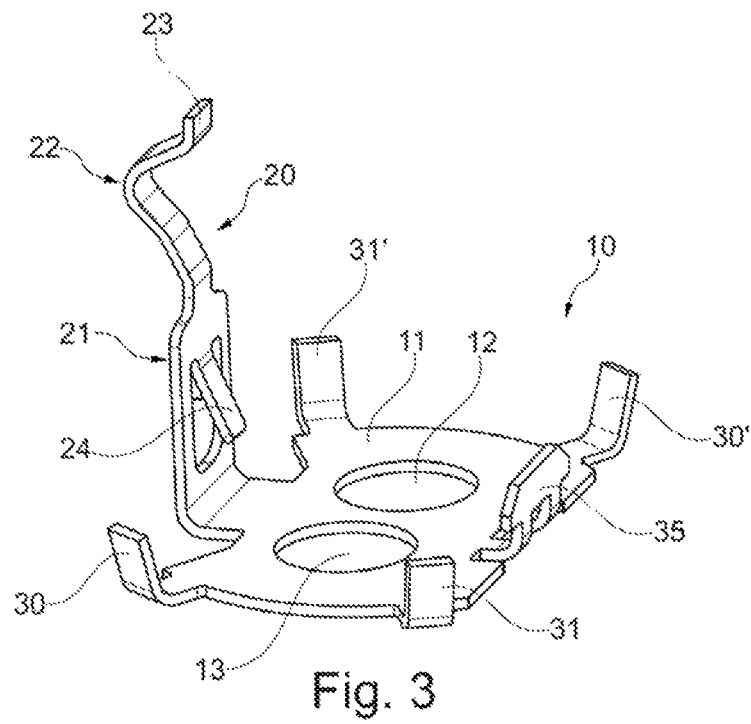
FIG. 3 shows the retainer of FIGS. 1 and 2 in a 3-dimensional cut view.

Now turning to FIG. 3, one can see that the grounding clip 10 is provided with a first grounding contact in form of a spring tongue 20. The spring tongue 20 has a straight portion 21 that extends perpendicular from the flat base 11. In other words, it extends in a plane that is perpendicular to the plane defined by the flat base 11 and being parallel to the mating direction. The free end of the spring tongue 20 comprises a bent portion 22, that—as one can take from FIG. 3—is not perpendicular to the flat base 11, but rather inclined at an angle of a proximately 60° thereto. The spring tongue 20 comprises a tip 23 that in assembled condition with the retainer 40 is arranged in an undercut of the retainer 40, such that the spring tongue 20 is pre-tensioned. As shown, the spring tongue 20 is arranged at an edge of the flat base 11 and the bent portion 22 protrudes outwards away from the flat base 11. In other words, the spring tongue 20 protrudes outwards away from a longitudinal centerline of the flat base 11, wherein the longitudinal centerline is parallel with the mating direction. This allows a very compact design and it requires only the minimum amount of space inside of the retainer 40. In the shown embodiments, the straight portion 21 of the spring tongue 20 extends for about 50% of the length of the spring tongue 20. The spring tongue 20 further comprises a latching hook 24, that is adapted to latch the grounding clip 10 onto the retainer 40, as one can take from FIG. 4. The latching hook 24 is arranged at the straight portion 21 of the spring tongue 20. At the four corners of the essentially rectangular flat base 11, two pairs of grounding contacts 30, 30' and 31, 31' are arranged, that in assembled condition are in contact with corresponding electroconductive parts of the airbag squib. The contacts of each pair are arranged on respective opposite ends of the flat base 11, i.e. the grounding contact 30 is on the opposite end of the flat base 11 relative to the grounding contact 30' and the grounding contact 31 is on the opposite side of the grounding contact 31'.

The grounding clip 10 further comprises a fixing leg 35 that protrudes perpendicular from the flat base 11. The fixing leg 35 has essentially a T-shape and extends in a plane that is perpendicular to the plane defined by the flat base 11. The T-shape form offers the advantage that it provides several corners and edges, that can be used to securely anchor the fixing leg 35 inside of the retainer 40.

Figure 4:
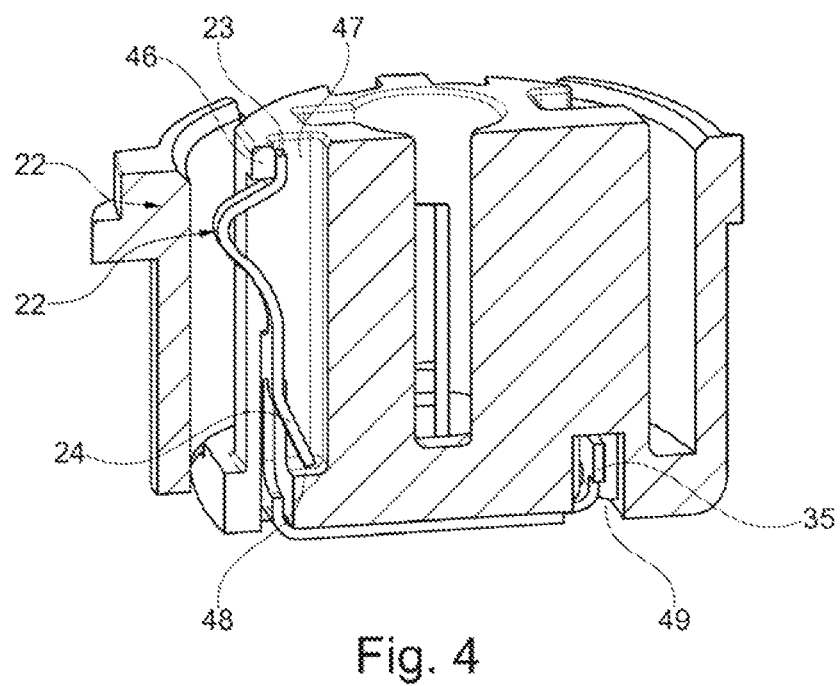
FIG. 4 shows the grounding clip used with the retainer.

FIG. 4 shows a 3-dimensional cut view of the retainer 40 of FIGS. 1 and 2. One can see how the spring tongue 20 extends inside the retainer 40. The tip 23 at the free end of the spring tongue 20 is arranged in an undercut 46 of the retainer 40, such that the spring tongue 20 is pre-tensioned. Further, the tip 23 abuts a wall of undercut 46 on the one hand, but is free to move in a clearance 47 provided inside of retainer 40. This further increases the flexibility of locking spring tongue 20 and thereby the positive effect provided by bent portion 22 with regard to contact quality with a corresponding counter grounding element. One can further see from FIG. 4, how the latching hook 24 latches behind shoulder 48, thereby preventing that the grounding clip 10 can be removed unintentionally from the retainer 40. The latching hook 24 can be disengaged by introducing a suitable tool into clearance 47. The fixing leg 35 provides additional fixation in a corresponding opening 49 provided in the bottom of retainer 40.

Figure 5:
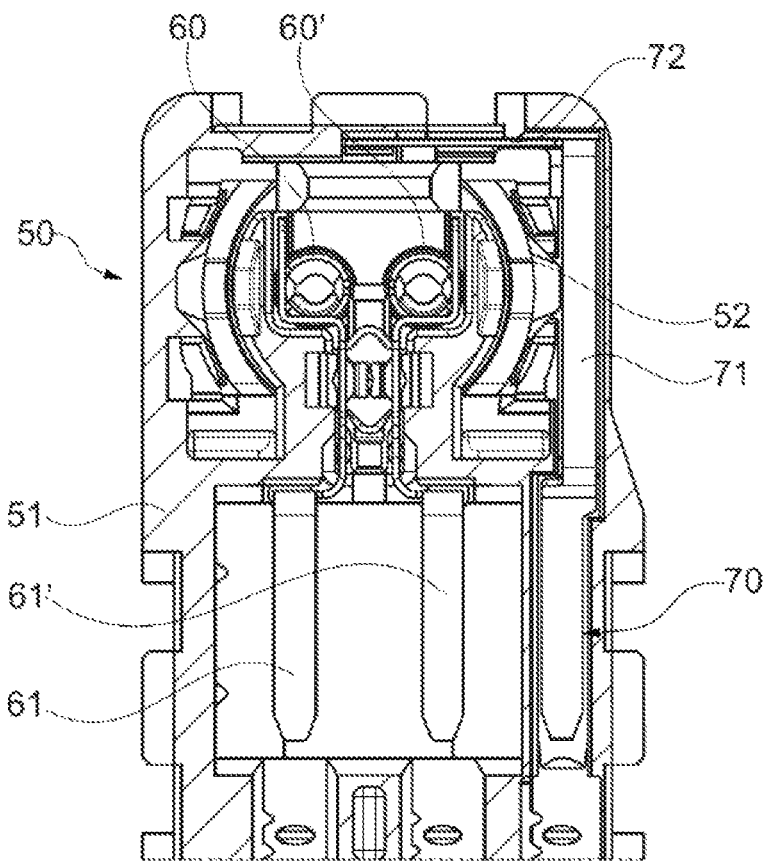
FIG. 5 shows a cut, top view of an airbag squib connector.
Figure 6:
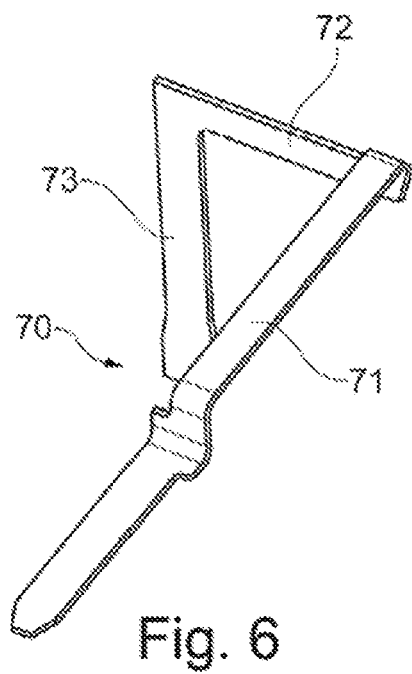
FIG. 6 shows a 3-dimensional view of the grounding contact used in the squib connector of FIG. 5.

FIG. 5 shows a top view of the interior of an airbag squib connector 50 that is suitable to cooperate with the retainer 40 shown in FIGS. 1, 2 and 4. The airbag squib connector 50 comprises a connector housing 51, which can be closed by a cover (not shown), which is however removed in the illustration of FIG. 5, to allow a view of the interior of connector housing 51. The connector housing 51 has a plug-in portion 52 that extends downwardly in the orientation of FIG. 5. Inside of plug-in portion 52, two female contacts terminals 60, 60' are arranged, and each terminal is provided with electrical signal lines 61 and 61'. Further, a grounding contact 70 extends through the connector housing 51 essentially parallel to the electrical signal lines 61, 61'. A first portion 71 of the grounding contact 70 extends thereby in a plane perpendicular to the mating direction (which is as the skilled person will recognize "downwardly" in the orientation shown in FIG. 5). A second portion 72 branches off perpendicular from the first portion 71 but still essentially in the same plane as the first portion 71. From this second portion 72 a contact portion 73 branches off that extends in the mating direction. The geometric or spatial orientation of the grounding contact 70 can best be understood by considering the 3-dimensional illustration of FIG. 6. From FIG. 6, one can also take that the whole grounding contact 70 is made from a single, integral part of sheet metal that is stamped and bent into the desired shape.

Figure 7:
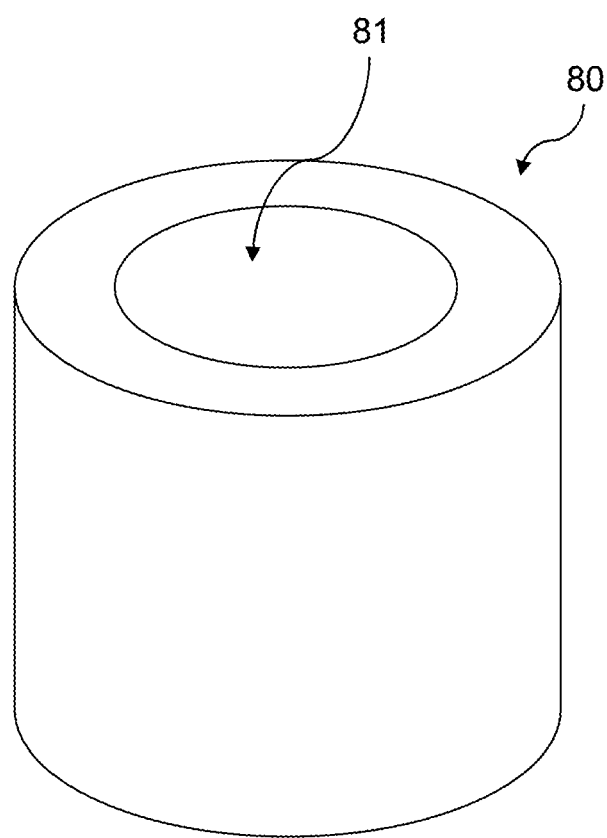
FIG. 7 shows an airbag squib adapted to receive an airbag retainer insert in a purely schematic illustration.

Finally, FIG. 7 shows an airbag squib 80 in a purely schematic illustration. The airbag squib 80 has an airbag squib receptacle 81 adapted to receive an airbag retainer insert, such as the retainer 40, therein.

LIST OF REFERENCE NUMERALS

10 Grounding clip
11 Flat base
12, 13 Cut-outs
20 Spring tongue
21 Straight portion
22 Bent portion
23 Tip
24 Latching hook
30,30',31, 31' Second grounding contacts
35 Fixing leg
40 Airbag retainer insert, Retainer
41 Mating phase
42 Coding elements
43 Aperture
44 Recess
45 Bottom of retainer
46 Undercut
47 Clearance
48 Shoulder
49 Opening
50 Squib connector
51 Connector housing
52 Plug-in portion
60, 60' Female contact terminal
61, 61' Electrical signal lines
70. First grounding contact
71 First portion
72 Second portion
73 Contact portion
80 Airbag squib
81 Airbag squib receptacle

We claim:

1. A grounding clip configured to be mounted to an airbag retainer insert of an airbag ignition system, comprising:
a first grounding contact in the form of a spring tongue and configured to contact a grounding contact of a squib connector;
a second grounding contact configured to contact an electroconductive part of an airbag squib; and
a flat base interconnecting the first and second grounding contacts, wherein the spring tongue has a straight portion that extends perpendicularly from the flat base, wherein the flat base is essentially rectangular, wherein a free end of the spring tongue comprises a bent portion that is not perpendicular to the flat base, wherein the grounding clip comprises a fixing leg that protrudes perpendicularly from the flat base, and wherein the fixing leg essentially has a T-shape and extends in a plane that is perpendicular to the plane defined by the flat base, wherein the spring tongue is arranged at an edge of the flat base and the bent portion protrudes outwards away from the flat base.

2. The grounding clip of claim 1, wherein the grounding clip does not short-circuit contact pins of the airbag squib.

3. The grounding clip of claim 1, wherein the straight portion of the spring tongue extends for at least 30% of a length of the spring tongue.

4. The grounding clip of claim 1, wherein the flat base comprises a cut-out configured to receive contact pins of the airbag squib therethrough.

5. The grounding clip of claim 1, wherein the grounding clip comprises two pairs of second grounding contacts configured to contact electroconductive parts of the airbag squib and wherein the grounding contacts of each pair of second grounding contacts are arranged on respective opposite ends of the flat base.

6. The grounding clip of claim 1, wherein the grounding clip is shaped such that the flat base is flush with the bottom of the airbag retainer insert and the spring tongue extends through the inside of the airbag retainer insert when the grounding clip is assembled to the airbag retainer insert.

7. A grounding clip configured to be mounted to an airbag retainer insert of an airbag ignition system, comprising:
a first grounding contact in the form of a spring tongue and configured to contact a grounding contact of a squib connector;
a second grounding contact configured to contact an electroconductive part of an airbag squib; and
a flat base interconnecting the first and second grounding contacts, wherein the spring tongue has a straight portion that extends perpendicularly from the flat base, wherein the flat base is essentially rectangular, wherein a free end of the spring tongue comprises a bent portion that is not perpendicular to the flat base, wherein the grounding clip comprises a fixing leg that protrudes perpendicularly from the flat base, and wherein the fixing leg essentially has a T-shape and extends in a plane that is perpendicular to the plane defined by the flat base, wherein the spring tongue comprises a latching hook configured to latch the grounding clip onto the airbag retainer insert and wherein the latching hook is arranged at the straight portion of the spring tongue.

8. The grounding clip of claim 7, wherein the grounding clip does not short-circuit contact pins of the airbag squib.

9. The grounding clip of claim 7, wherein the straight portion of the spring tongue extends for at least 30% of a length of the spring tongue.

10. The grounding clip of claim 7, wherein the flat base comprises a cut-out configured to receive contact pins of the airbag squib therethrough.

11. The grounding clip of claim 7, wherein the grounding clip comprises two pairs of second grounding contacts configured to contact electroconductive parts of the airbag squib and wherein the grounding contacts of each pair of second grounding contacts are arranged on respective opposite ends of the flat base.

12. The grounding clip of claim 7, wherein the grounding clip is shaped such that the flat base is flush with the bottom of the airbag retainer insert and the spring tongue extends through the inside of the airbag retainer insert when the grounding clip is assembled to the airbag retainer insert.

13. A grounding clip configured to be mounted to an airbag retainer insert of an airbag ignition system, comprising:
a first grounding contact in the form of a spring tongue and configured to contact a grounding contact of a squib connector;
a second grounding contact configured to contact an electroconductive part of an airbag squib; and
a flat base interconnecting the first and second grounding contacts, wherein the spring tongue has a straight portion that extends perpendicularly from the flat base and wherein a free end of the spring tongue comprises a bent portion that is not perpendicular to the flat base; and an airbag retainer insert for an airbag ignition system, wherein the airbag retainer insert defines a recess in which the grounding clip is disposed, wherein the free end of the spring tongue is arranged in an undercut of the airbag retainer insert such that the spring tongue is pre-tensioned when the grounding clip is mounted to the airbag retainer insert.

14. The grounding clip of claim 13, wherein the grounding clip does not short-circuit contact pins of the airbag squib.

15. The grounding clip of claim 13, wherein the straight portion of the spring tongue extends for at least 30% of a length of the spring tongue.

16. The grounding clip of claim 13, wherein the flat base comprises a cut-out configured to receive contact pins of the airbag squib therethrough.

17. The grounding clip of claim 13, wherein the grounding clip comprises two pairs of second grounding contacts configured to contact electroconductive parts of the airbag squib and wherein the grounding contacts of each pair of second grounding contacts are arranged on respective opposite ends of the flat base.

18. The grounding clip of claim 13, wherein the grounding clip is shaped such that the flat base is flush with the bottom of the airbag retainer insert and the spring tongue extends through the inside of the airbag retainer insert when the grounding clip is assembled to the airbag retainer insert.

19. An airbag squib connector suited to cooperate with an airbag retainer insert, comprising:

a connector housing haVing a plug-in portion;

two female contact terminals arranged at least partially in the plug-in portion, each terminal being provided with an electrical signal line that extends through the connector housing;

a grounding contact extending through the connector housing essentially parallel to the electrical signal lines, wherein the grounding contact has a first portion that extends in a plane perpendicular to a mating direction and a second portion that branches off perpendicularly from the first portion, wherein the grounding contact further includes a flat base interconnecting the first and second portions, wherein the first portion has a straight portion that extends perpendicularly from the flat base, wherein the flat base is essentially rectangular, wherein a free end of the first portion comprises a bent portion that is not perpendicular to the flat base, wherein the grounding clip comprises a fixing leg that protrudes peppendicularly from the flat base, and wherein the fixing leg essentially has a T-shape and extends in a plane that is peppendicular to the plane defined by the flat base.

20. The airbag squib connector of claim 19, wherein the first portion, the second portion, and the contact portion are made from a single piece of sheet metal.

21. The grounding clip of claim 19, wherein the grounding clip does not short-circuit contact pins of the airbag squib.

22. The grounding clip of claim 19, wherein the straight portion of the spring tongue extends for at least 30% of a length of the spring tongue.

23. The grounding clip of claim 19, wherein the flat base comprises a cut-out configured to receive contact pins of the airbag squib therethrough.

24. The grounding clip of claim 19, wherein the grounding clip comprises two pairs of second grounding contacts configured to contact electroconductive parts of the airbag squib and wherein the grounding contacts of each pair of second grounding contacts are arranged on respective opposite ends of the flat base.

25. The grounding clip of claim 19, wherein the grounding clip is shaped such that the flat base is flush with the bottom of the airbag retainer insert and the spring tongue extends through the inside of the airbag retainer insert when the grounding clip is assembled to the airbag retainer insert.

* * * * *